US 10,897,457 B2
Jan. 19, 2021

(12) United States Patent
Childress et al.

(10) Patent No.: US 10,897,457 B2
(45) Date of Patent: Jan. 19, 2021

(54) PROCESSING OF IOT DATA BY INTERMEDIARIES (71) Applicant: International Business Machines Corporation, Armonk, NY (US)

(72) Inventors: Rhonda L. Childress, Austin, TX (US); Hari H. Madduri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 15/488,730

(22) Filed: Apr. 17, 2017

(65) Prior Publication Data
US 2018/0302386 A1  Oct. 18, 2018

(51) Int. Cl.
*H04L 29/06* (2006.01)
*H04L 9/14* (2006.01)
(Continued)

(52) U.S. Cl.
CPC ........ *H04L 63/0464* (2013.01); *G06F 21/606* (2013.01); *G06F 21/6254* (2013.01);
(Continued)

(58) Field of Classification Search
CPC ....... H04L 63/0464; H04L 9/14; H04L 67/12; H04L 69/22; H04L 2209/805; G06F 2221/2111
See application file for complete search history.

(56) References Cited

U.S. PATENT DOCUMENTS

| 9,998,434 B2 * | 6/2018 | Verzun | .................. H04L 9/0662 |
| 2004/0268123 A1 * | 12/2004 | Le | ......................... H04L 63/123 713/160 |

(Continued)

FOREIGN PATENT DOCUMENTS

WO   2015191324 A9   12/2015

OTHER PUBLICATIONS

Morabito et al; "Enabling Data Processing at the Network Edge through Lightweight Virtualization Technologies"; Source: To appear in CoWPER—International IEEE SE. Jun. 2016. 7 pp.

*Primary Examiner* — Izunna Okeke
*Assistant Examiner* — Bassam A Noaman
(74) *Attorney, Agent, or Firm* — Mollborn Patents, Inc.; Fredrik Mollborn (57) ABSTRACT

Methods and apparatus, including computer program products, implementing and using techniques for processing of data in an intermediary server. Data is received from an Internet of Things (IoT) enabled device. The data includes a readable header and an encrypted payload. An opaque algorithm is selected to process the payload, based on information contained in the header of the data. The selected opaque algorithm processes the encrypted payload of the data, wherein the opaque algorithm is invisible to the intermediary server. The processing includes: decrypting the encrypted payload, applying the opaque algorithm to the decrypted payload, and encrypting the results from processing the decrypted payload by the opaque algorithm. A new readable header is added to the encrypted results. The data, including the new readable header and the encrypted results, is forwarded to a different server, based on the information in the new readable header.

17 Claims, 3 Drawing Sheets

(51) Int. Cl.
*H04L 29/08* (2006.01)
*G06F 21/62* (2013.01)
*H04W 4/70* (2018.01)
*G06F 21/60* (2013.01)
*H04W 4/38* (2018.01)

(52) U.S. Cl.
CPC ............... *H04L 9/14* (2013.01); *H04L 67/12* (2013.01); *H04L 67/2804* (2013.01); *H04W 4/70* (2018.02); *G06F 2221/2111* (2013.01); *H04L 2209/16* (2013.01); *H04L 2209/805* (2013.01); *H04W 4/38* (2018.02)

(56) References Cited

U.S. PATENT DOCUMENTS

| | | | |
|---|---|---|---|
| 2008/0159287 A1* | 7/2008 | Nagarajan | H04L 12/66 370/392 |
| 2015/0181505 A1* | 6/2015 | Deng | H04W 48/10 713/160 |
| 2015/0310209 A1 | 10/2015 | Zhang | |
| 2015/0310219 A1* | 10/2015 | Haager | G06F 21/602 713/165 |
| 2016/0094421 A1* | 3/2016 | Bali | H04L 43/04 709/223 |
| 2016/0205106 A1* | 7/2016 | Yacoub | H04L 61/1511 726/28 |
| 2016/0301695 A1* | 10/2016 | Trivelpiece | H04W 4/70 |
| 2017/0315820 A1* | 11/2017 | Entezari | H04L 67/12 |

\* cited by examiner

PROCESSING OF IOT DATA BY INTERMEDIARIES

BACKGROUND

The present invention relates to data processing, and more specifically, to processing of Internet of Things data at gateways. The Internet of Things (IoT) is the internetworking of physical devices, vehicles, buildings, and other items embedded with electronics, software, sensors, actuators, and network connectivity that enable these devices to collect and exchange data. The IoT allows objects to be sensed and/or controlled remotely across existing network infrastructure, creating opportunities for more direct integration of the physical world into computer-based systems, and resulting in improved efficiency, accuracy and economic benefit in addition to reduced human intervention.

"Things," in the IoT sense, can refer to a wide variety of devices such as heart monitoring implants, biochip transponders on farm animals, electric clams in coastal waters, automobiles with built-in sensors, DNA analysis devices for environmental/food/pathogen monitoring or field operation devices that assist firefighters in search and rescue operations. These devices collect useful data with the help of various existing technologies and then autonomously or under the control of some kind of system flow the data to/from other systems and devices.

Typically, the IoT data flows via multiple gateways or aggregators into some type of cloud computing environment. At each gateway/aggregator (hereinafter referred to as an "intermediary") the data can be processed in some way, e.g., filtered, enhanced, encoded, modified, etc. However, there may be situations in which the processing should not be revealed to the intermediaries that handle the IoT data. Accordingly, there is a need for improved techniques for IoT data processing by intermediaries.

SUMMARY

According to one embodiment of the present invention, methods, systems and computer program products are provided for processing of data in an intermediary server. Data is received from an Internet of Things (IoT) enabled device. The data includes a readable header and an encrypted payload. An opaque algorithm is selected to process the payload, based on information contained in the header of the data. The selected opaque algorithm processes the encrypted payload of the data, wherein the opaque algorithm is invisible to the intermediary server. The processing includes: decrypting the encrypted payload, applying the opaque algorithm to the decrypted payload, and encrypting the results from processing the decrypted payload by the opaque algorithm. A new readable header is added to the encrypted results. The data, including the new readable header and the encrypted results, is forwarded to a different server, based on the information in the new readable header.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

As was described above, typically, the IoT data flows via multiple intermediaries where the IoT data can be processed. However, there are situations in which the processing should not be revealed to the intermediaries that handle the IoT data. Basic encryption and decryption generally solves the problem of not exposing data to the intermediaries. For example, Virtual Private Network (VPN) like schemes encrypt data transmissions between a client and server via some Internet service provider. However, unlike VPNs, where all data is faithfully transmitted between a sender and a receiver, the challenge with IoT data is that it is often desirable for the IoT data to be filtered or reduced according to some algorithm as the IoT data flows through the intermediaries. In order to do this filtering or data reduction, conventional intermediaries would need to know what the data looks like and what algorithms to apply. This is not acceptable in situations where IoT data must be kept confidential.

The various embodiments of the invention pertain to techniques for allowing intermediaries to process data obtained from IoT sensors, without knowing what that processing logic is. It should be noted that while the invention will be described herein by way of example with data relating to IoT sensors, these processing techniques are also applicable to essentially any type of data that is suitable for opaque processing by an intermediary.

In order to accomplish these goals, a common feature between the various embodiments of the invention is the ability to package the data processing algorithm as an executable that can run in the intermediary in such a way that the intermediary is unaware of how the actual algorithm processes the data. For example, the algorithm can be packaged in a standardized, self-contained, executable package (hereinafter simply referred to as "package"), and the intermediary can provide a secure and opaque runtime environment for the package, also referred to as a "container." That is, even though the intermediary cannot see what is inside the package, it is able to load and execute the package by using the container. The package contains everything needed to run the software, such as the software code itself, runtime environment, system tools, system libraries, etc., that is, essentially anything that can be installed on a server. The use of containers guarantees that the software will always run in the same way, regardless of its environment. Further, using containers also results in the applications being isolated, not only from one another, but also from the underlying infrastructure, while providing an added layer of protection for the application.

Further, in accordance with the various embodiments described herein, intermediaries can use different containers to opaquely process IoT data belonging to different owners (for example, a manufacturer of washing machines may want her IoT data processed with her own algorithm, and a manufacturer of television sets may want to process their IoT data with a different algorithm). The actual IoT data details may also be protected from the intermediary. The IoT data can be sent in an encrypted format by the IoT device but the IoT data can be decrypted, have filtering/processing applied and be re-encrypted for transmission by the algorithm while the IoT data is inside the container, and without the intermediary having any knowledge of the data or the processing thereof in the container. Various embodiments will now be described by way of example and with reference to the figures.

Figure 1:
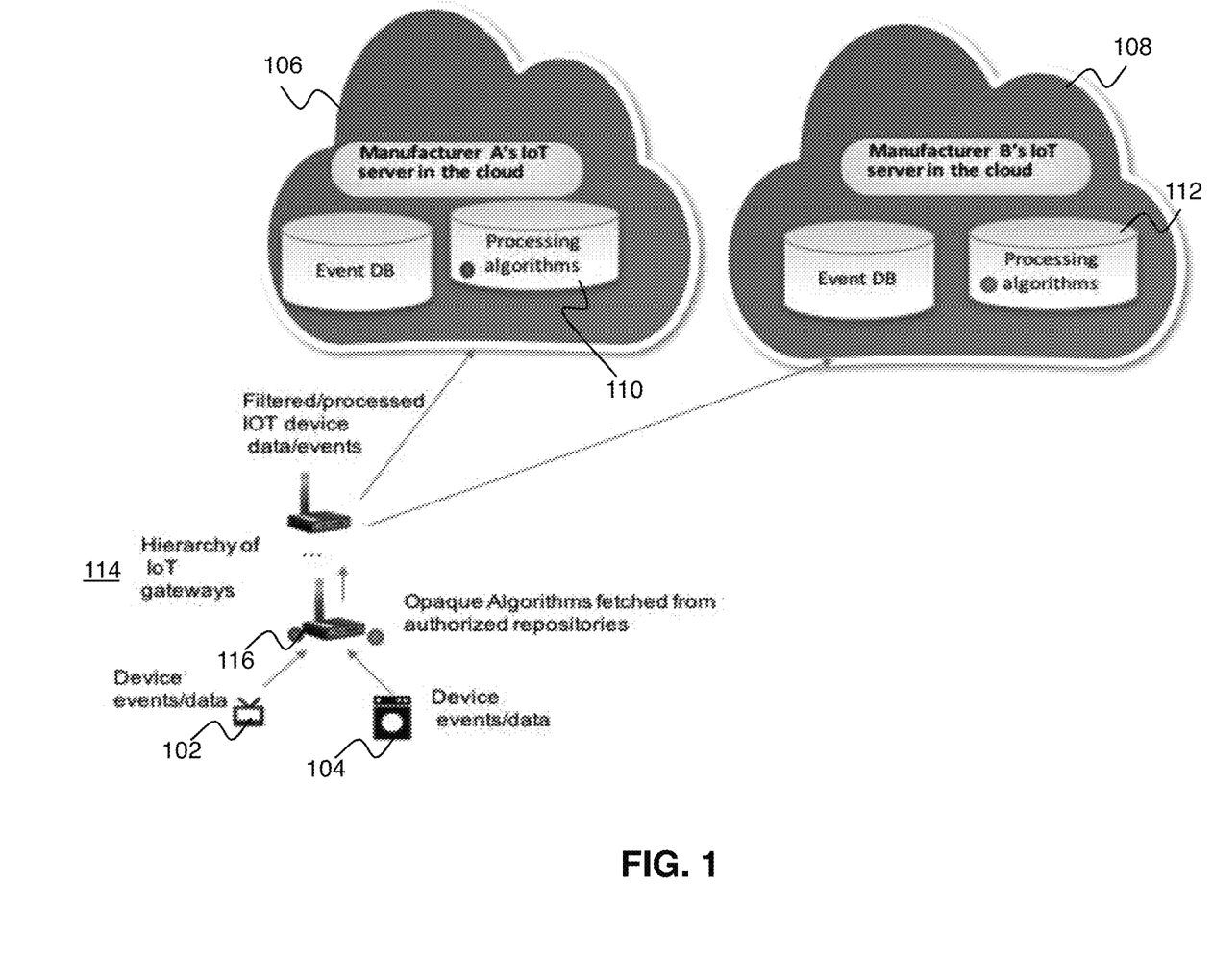
FIG. 1 shows a system for processing of IoT data, in accordance with one embodiment.

With reference now to FIG. 1, consider the following scenario. A TV manufacturer and a washing machine manufacturer both build IoT enabled appliances. Their respective devices are deployed in users' premises. On a periodic basis, IoT sensors (102, 104) that are either built in to or otherwise associated with the devices send data to designated data collection points (106, 108), which are typically located in a cloud-computing environment. The received IoT data are processed by processing algorithms (110, 112) from the respective manufacturers by sending the algorithms to a common gateway. The processing is done to gain insights on how their respective devices perform, how they are being used by the consumers, as well as other information of interest.

In most cases the data generated and transmitted to the cloud quickly becomes voluminous and therefore it is beneficial to do some intelligent filtering and processing closer to the data generation points, i.e., closer to the respective users, to reduce data transmission to the data collection points (106, 108). For example, if an IoT sensor's data does not change between one reading and the next, then there is no need send anything up the stream. It is also possible to send more or fewer details, depending on one of the fields within the data. For example, for a normal temperature reading, only the temperature value may be sent up, but if the temperature rises above a 'danger' threshold, other values (e.g., noise level, vibration, etc.) can also be sent. One example of intelligent processing is detecting anomalies in the sensor data (e.g., a smooth sine wave vs. sudden spikes in the values). Typically this filtering and processing is done by a set of data gateways (114) (i.e., the intermediaries) through which the collected IoT data flows. The data gateways (114) can be arranged in a hierarchical relationship, with the top of the hierarchy feeding into the data collection points (106, 108).

Conventional data gateways (114) typically download such algorithms from some kind of "trusted repository" and apply the algorithms to the data. However, as was mentioned above, there are times when the filtering/processing needs to be done by private algorithms, which the manufacturers do not want to reveal to others. Typically, the gateways are not owned and operated by the device manufacturers, but rather by intermediaries, much like Internet service providers between an end user and his web-based application service (e.g., Chat, email, etc.).

Figure 2:
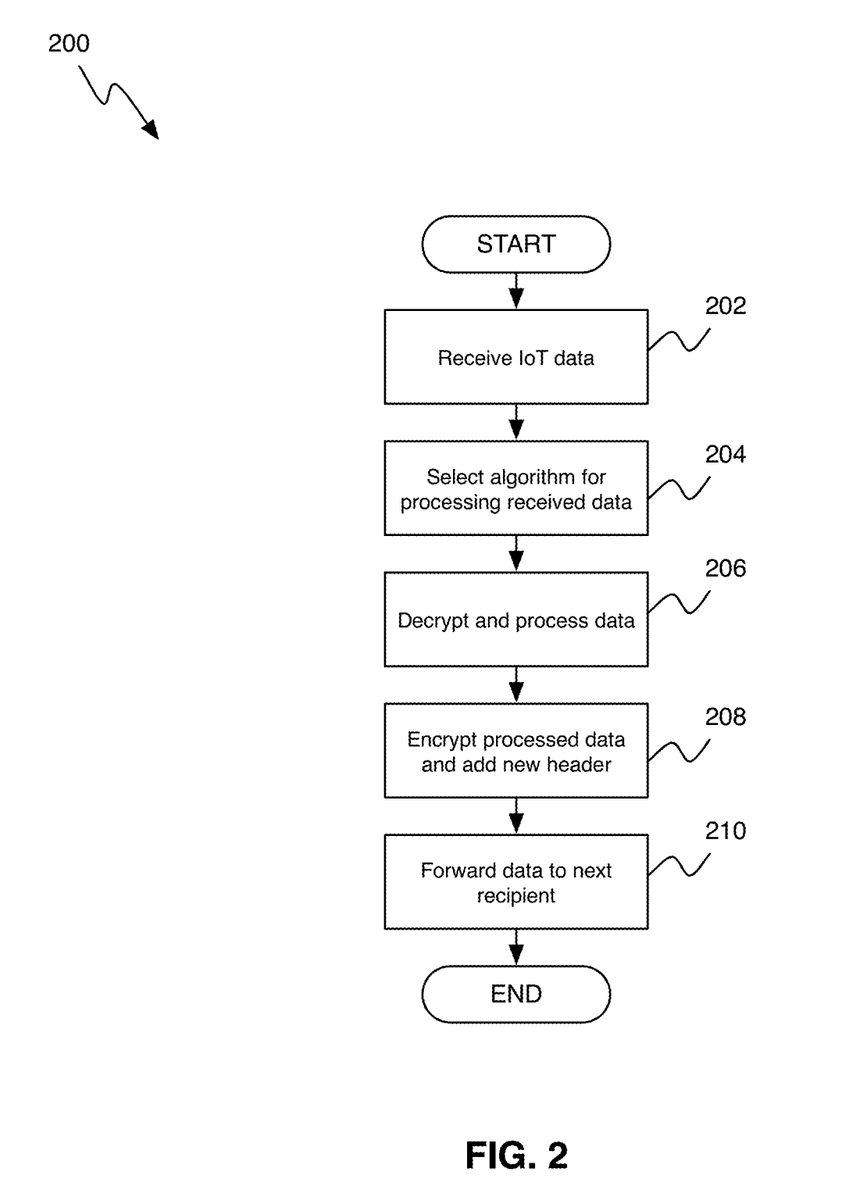
FIG. 2 shows a flowchart for processing of IoT data by intermediaries, in accordance with one embodiment.

In order to address this issue, the hierarchy of gateways (114) shown in FIG. 1, operate as illustrated by the flowchart in FIG. 2. As was described above, the gateways (114) simply provide an execution engine in which programs run in secure containers.

As can be seen in FIG. 2, the processing (200) begins by receiving IoT data from the IoT sensors (step 202). In the embodiment described herein, the IoT data has a header that is readable by the gateway (114) and a payload that is encrypted. The encrypted payload is not visible to the gateway execution engine.

The gateway reads the header and selects an opaque algorithm for processing of the data, based on the information in the header (step 204). The opaque algorithm can be downloaded from an approved repository of algorithms (110, 112), such as an IoT server (106, 108) in the cloud. In some embodiments, algorithms can be downloaded ahead of time to the gateway (114) for all manufacturers and all types of data payloads. In other embodiments, the download of algorithms can occur dynamically, for example, depending on what type of payload, where the payload is destined, and/or where the payload originated. In yet other embodiments, different algorithms can be downloaded based on different times of the day, week, etc. Many variations of algorithms and download patterns can be envisioned by those having ordinary skill in the art.

It should be noted that while the opaque algorithm is typically downloaded from a repository, as described above, there are also embodiments in which one or more algorithms are included in the received IoT data itself, such that the algorithms always "travel" along with the data. Typically these algorithms are also encrypted, just like the rest of the payload. Thus, in these embodiments, the IoT sensors may "suggest" appropriate processing algorithms by including them with the sensor data, in contrast to have the algorithms provided by the manufacturer's repository. The readable header of the package can contain information about how to access these algorithms and which particular algorithm to use at a certain gateway (114) in the hierarchy of gateways. The header also contains information that allows the gateway to download a decryption key from the manufacturer, as opposed to downloading a decryption algorithm. The decryption key, once downloaded, can then be applied in the container to decrypt the data and the appropriate algorithm.

Next, the encrypted payload is processed by the gateway (114) using the selected opaque algorithm (step 206). The opaque algorithm runs inside the container, and is thus invisible to the gateway (114). The opaque algorithm decrypts the encrypted data payload, processes the data payload, and produces output data, which is to be sent to the next gateway (114) in the hierarchy of gateways, and eventually to the manufacturer's IoT server (106, 108).

Next, the output data is encrypted by the opaque algorithm and a new readable header is added (step 208), such that again the IoT data packet has an encrypted payload and a readable header. Finally the gateway (114) reads the header and forwards the data packet to the next gateway (step 210), which ends the gateway processing 200. In some embodiments, the gateway (114) can optionally also destroy the container after the processing is completed, for maximum security.

There are also embodiments in which the code set (i.e., the actual code that implements the algorithms) can be attached in its entirety to the IoT data, but where different portions of the code set are encrypted by different keys. As the message that originated from the sensor passes through various gateways, each gateway container will use its key, decrypt its portion of the code, execute that code on the message data and pass it upward in the hierarchy of gateways, as described above. That is, exchanged keys with a gateway only allow decryption of the portion of code necessary for the particular gateway in question. Thus, if there are N gateways to pass through, then at the IoT sensor (i.e., the source), the packet would contain one "data chunk" and N "chunks of code," where each chunk of code is encrypted with a different key. Each gateway container then opens its corresponding portion of code and applies the portion of code to the data.

In some embodiments, the data payload can be attached in its entirety but different parts of the data payload can be encrypted by different keys, and different gateways will only decrypt what they can based on exchanged keys, similar to what was described in the previous paragraph with respect to the different portions of code.

Figure 3:
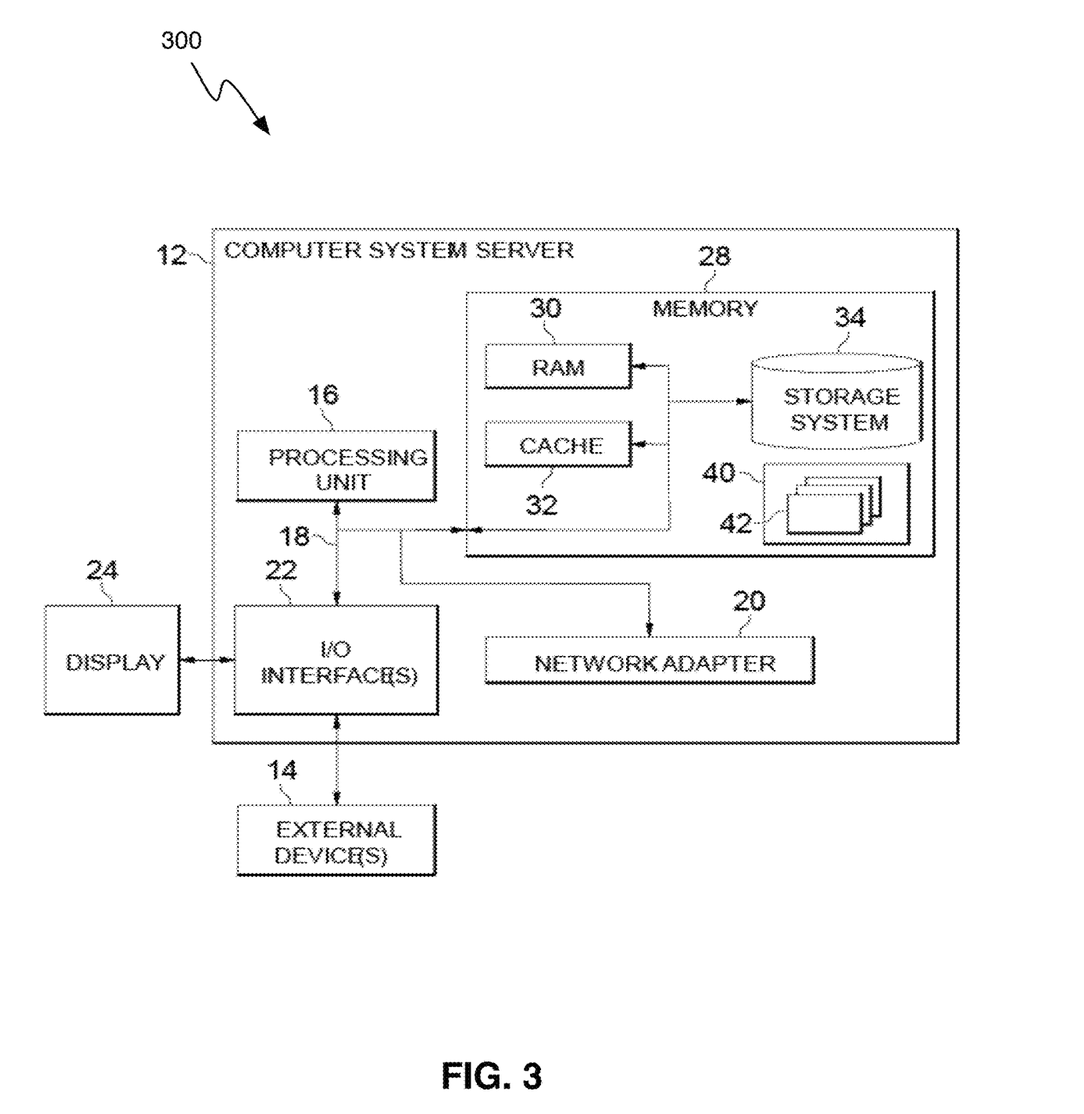
FIG. 3 shows a schematic view of a computer system in which various embodiments of the present invention can be implemented.

FIG. 3 shows a schematic view of a computer system in which various embodiments of the present invention can be implemented. As shown in FIG. 3, the computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system/server 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, and redundant processing units The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for opaque processing of Internet of Things (IoT) data in a gateway in a hierarchy of connected gateways, comprising:

receiving, at the gateway, data from an IoT enabled device, wherein the data comprises a header that is readable by the gateway and an encrypted payload that is not readable by the gateway, and wherein the header contains information about what executable package to use for processing the IoT data at the gateway;

selecting an executable package from a plurality of executable packages in accordance with the information contained in the header, wherein the selecting the executable package is based on one or more of: type of payload, ultimate receiver of the payload, geographical origin of the payload, and time of day, wherein the executable package includes an opaque algorithm for processing the encrypted payload at the gateway, wherein the plurality of executable packages include private opaque algorithms that are owned by various private entities for processing their own IoT data and do not want to have their opaque algorithms and their own IoT data revealed to the hierarchy of connected gateways;

loading the selected executable package into a container on the gateway;

processing, inside the container, by the opaque algorithm, the encrypted payload of the data, wherein the opaque algorithm, the encrypted payload processed inside the container and the processing by the opaque algorithm are invisible to the gateway, and comprises:

decrypting the encrypted payload, applying the opaque algorithm to the decrypted payload, and encrypting the results from the application of the opaque algorithm to the decrypted payload;

adding a new header that is readable by the gateway to the encrypted results, wherein the new header contains routing information and information about what executable package to use for processing the IoT data at a different gateway in the hierarchy of gateways; and forwarding the data including the new readable header and the encrypted results to the different gateway, based on the routing information contained in the new header.

2. The method of claim 1, further comprising: downloading the executable package from an approved repository of executable packages, based on information contained in the header.

3. The method of claim 2, wherein downloading the executable package occurs prior to receiving the data.

4. The method of claim 2, wherein downloading the executable package occurs dynamically after the data has been received, and based on information contained in the header.

5. The method of claim 1, further comprising: destroying the executable package after processing has been completed.

6. The method of claim 1, wherein the received data further includes one or more opaque algorithms for processing the payload.

7. The method of claim 1, wherein different parts of the payload are encrypted using different encryption keys.

8. A computer program product for opaque processing of Internet of Things (IoT) data in a gateway in a hierarchy of connected gateways,
the computer program product comprising a computer readable storage medium having program instructions embodied therewith, wherein the computer readable storage medium is not a transitory signal per se, the program instructions being executable by a processor to perform a method comprising:
receiving, at the gateway, data from an IoT enabled device, wherein the data comprises a header that is readable by the gateway and an encrypted payload that is not readable by the gateway, and
wherein the header contains information about what executable package to use for processing the IoT data at the gateway;
selecting an executable package from a plurality of executable packages in accordance with the information contained in the header,
wherein the selecting the executable package is based on one or more of: type of payload, ultimate receiver of the payload, geographical origin of the payload, and time of day,
wherein the executable package includes an opaque algorithm for processing the encrypted payload at the gateway,
wherein the plurality of executable packages include private opaque algorithms that are owned by various private entities for processing their own IoT data and do not want to have their opaque algorithms and their own IoT data revealed to the hierarchy of connected gateways;
loading the selected executable package into a container on the gateway;
processing, inside the container, by the opaque algorithm, the encrypted payload of the data, wherein the opaque algorithm, the encrypted payload processed inside the container and the processing by the opaque algorithm are invisible to the gateway, and comprises:
decrypting the encrypted payload,
applying the opaque algorithm to the decrypted payload, and
encrypting the results from the application of the opaque algorithm to the decrypted payload;
adding a new header that is readable by the gateway to the encrypted results,
wherein the new header contains routing information and information about what executable package to use for processing the IoT data at a different gateway in the hierarchy of gateways; and
forwarding the data including the new readable header and the encrypted results to the different gateway, based on routing information contained in the new header.

9. The computer program product of claim 8, wherein the method further comprises: downloading the executable package from an approved repository of executable packages, based on information contained in the header.

10. The computer program product of claim 9, wherein downloading the executable package occurs prior to receiving the data.

11. The computer program product of claim 9, wherein downloading the executable package occurs dynamically after the data has been received, and based on information contained in the header.

12. The computer program product of claim 8, wherein the method further comprises: destroying the executable package after processing has been completed.

13. The computer program product of claim 8, wherein the received data further includes one or more opaque algorithms for processing the payload.

14. The computer program product of claim 8, wherein different parts of the payload are encrypted using different encryption keys.

15. A system for opaque processing of Internet of Things (IoT) data in a gateway in a hierarchy of connected gateways comprising:
a processor; and
a memory containing instructions that when executed by the processor causes the following steps to be performed:
receiving, at the gateway, data from an IoT enabled device, wherein the data comprises a header that is readable by the gateway and an encrypted payload that is not readable by the gateway, and
wherein the header contains information about what executable package to use for processing the IoT data at the gateway;
selecting an executable package from a plurality of executable packages in accordance with the information contained in the header,
wherein the selecting the executable package is based on one or more of: type of payload, ultimate receiver of the payload, geographical origin of the payload, and time of day,
wherein the executable package includes an opaque algorithm for processing the encrypted payload at the gateway,
wherein the plurality of executable packages include private opaque algorithms that are owned by various private entities for processing their own IoT data and do not want to have their opaque algorithms and their own IoT data revealed to the hierarchy of connected gateways;
loading the selected executable package into a container on the gateway;
processing, inside the container, by the opaque algorithm, the encrypted payload of the data, wherein the opaque algorithm, the encrypted payload processed inside the container and the processing by the opaque algorithm are invisible to the gateway, and comprises:
decrypting the encrypted payload,
applying the opaque algorithm to the decrypted payload, and
encrypting the results from the application of the opaque algorithm to the decrypted payload;
adding a new header that is readable by the gateway to the encrypted results,
wherein the new header contains routing information and information about what executable package to use for processing the IoT data at a different gateway in the hierarchy of gateways; and forwarding the data including the new readable header and the encrypted results to the different gateway, based on the routing information contained in the new header.

16. The system of claim 15, further comprising: destroying, by the processor, the executable package after processing has been completed.

17. The system of claim 15, wherein the received data further includes one or more opaque algorithms for processing the payload.

* * * * *